United States Patent

[11] 3,610,846

| [72] | Inventor | William W. Hanshew<br>R. #1, Brookville, Ohio 45309 |
|---|---|---|
| [21] | Appl. No. | 873,934 |
| [22] | Filed | Nov. 4, 1969 |
| [45] | Patented | Oct. 5, 1971 |

[54] SEQUENCE CONTROL DEVICE WITH IMPROVED MOVABLE TRAVERSING TRACK MEANS CONTAINING DRIVE AND AUTOMATIC DISABLING MEANS
15 Claims, 6 Drawing Figs.

| [52] | U.S. Cl. | 200/18, 200/33 D, 200/38 E |
|---|---|---|
| [51] | Int. Cl. | H01h 3/00, H01h 43/10 |
| [50] | Field of Search | 200/16 R, 18, 33.4, 38 E, 33 D |

[56] References Cited
UNITED STATES PATENTS

| 406,798 | 7/1889 | Van Depoele | 200/18 X |
| 2,502,438 | 4/1950 | Deakin | 200/16 X |
| 3,202,776 | 8/1965 | Haselfoot et al. | 200/18 |
| 3,495,052 | 2/1970 | Tauscher | 200/16 X |

Primary Examiner—J. R. Scott
Attorney—Jerome P. Bloom

ABSTRACT: A sequence control device in which a traveling carriage traverses a plurality of control stations under the influence of an intermittently activated constant speed drive means. The traveling carriage mounts a contact medium which makes successive contact with spaced contacts defining said control stations. The control stations may be selectively and differentially positioned to provide for a desired time lapse in respect to the movement of the traveling carriage from one station to another.

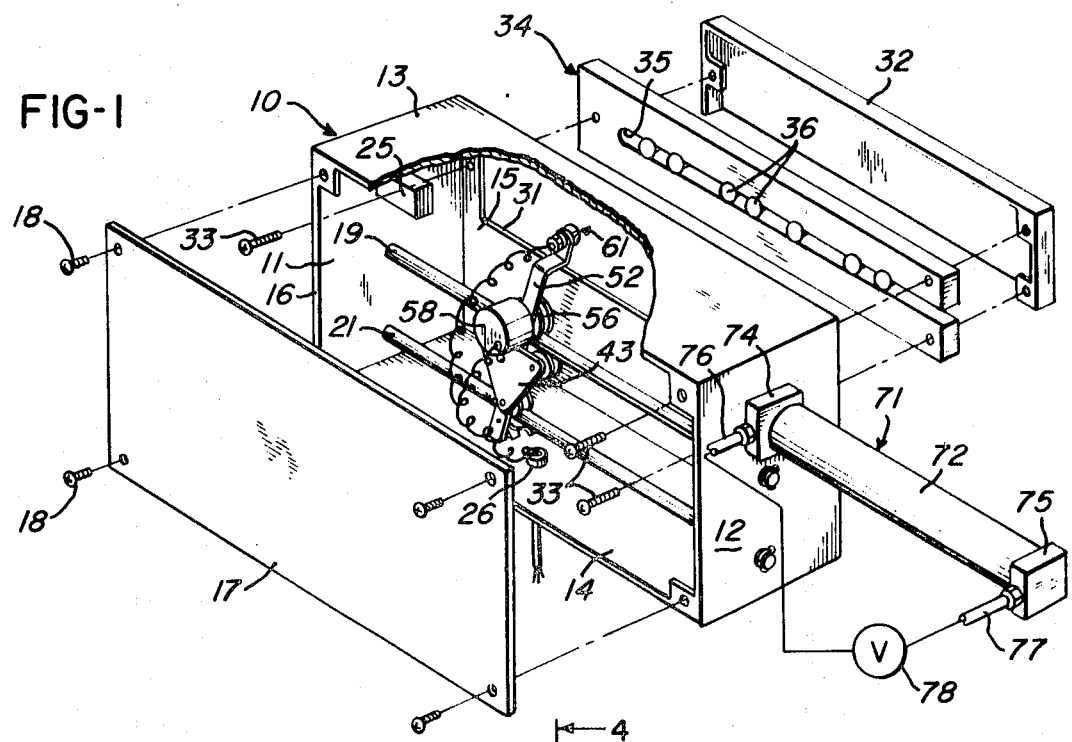
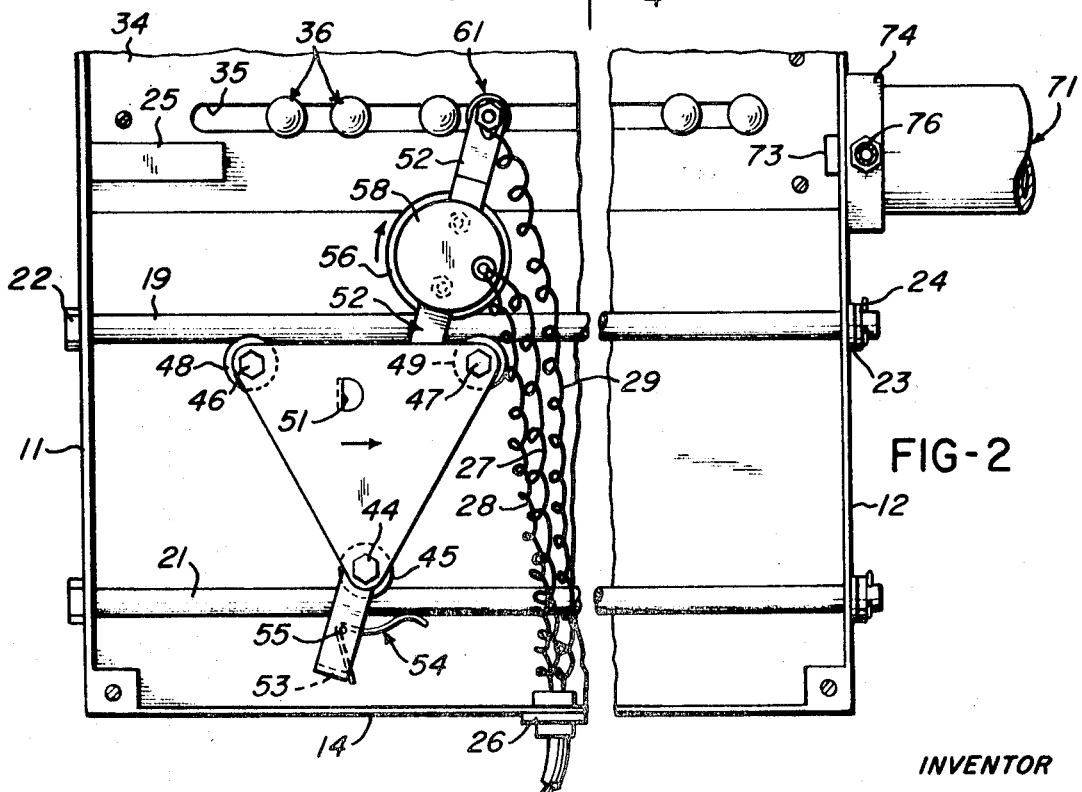

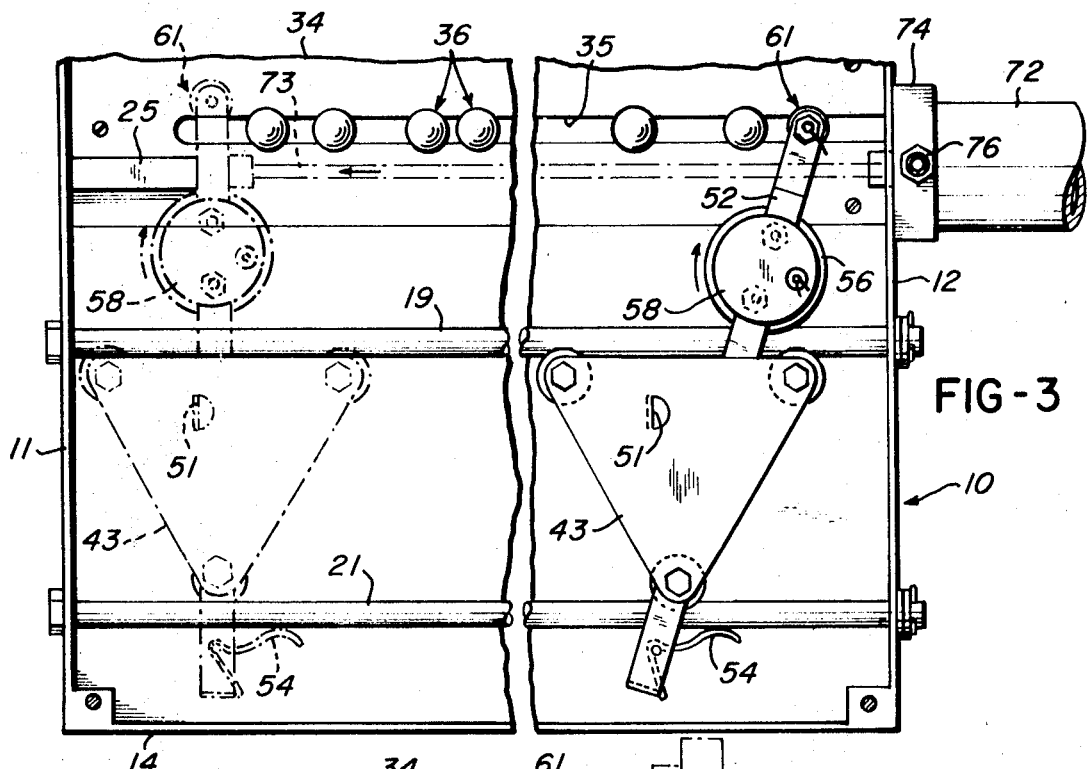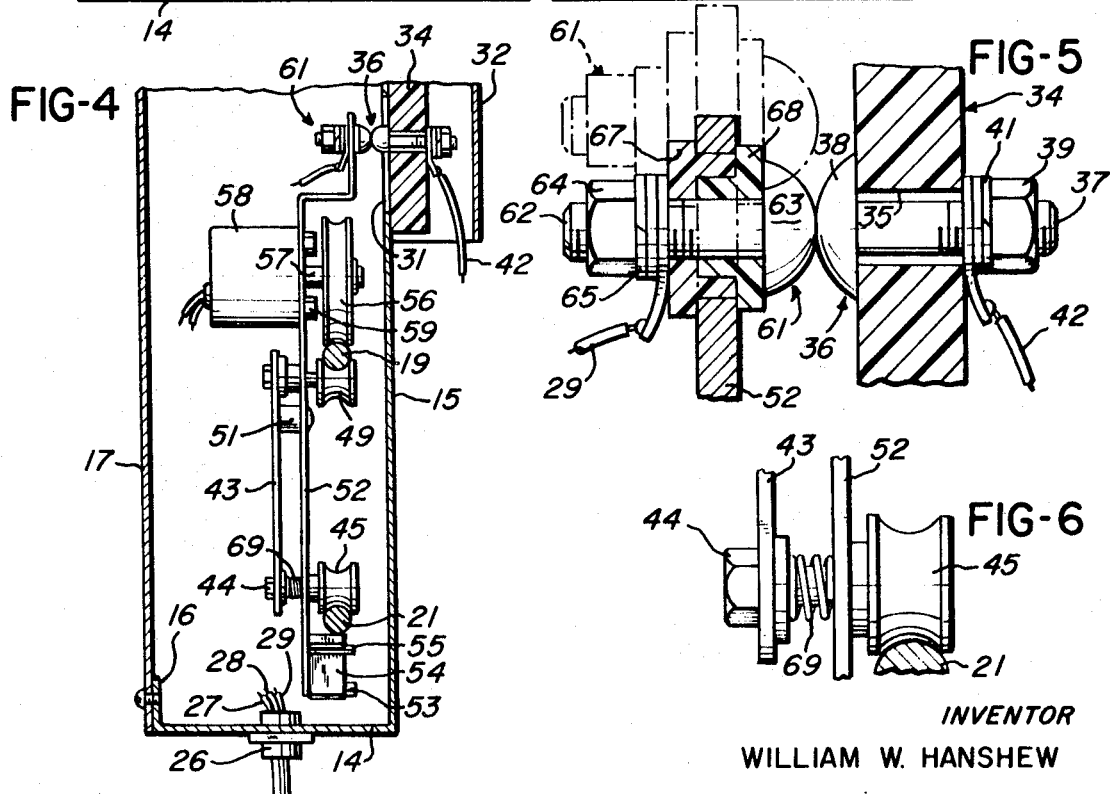

3,610,846

SEQUENCE CONTROL DEVICE WITH IMPROVED MOVABLE TRAVERSING TRACK MEANS CONTAINING DRIVE AND AUTOMATIC DISABLING MEANS

BACKGROUND OF THE INVENTION

This invention relates to improvements in sequence control devices and provides the same in a form particularly advantageous for use in the automating of machine tool and the like operations. It will be recognized, however, that the application of the invention is not so limited and such is not intended.

The industrial arts afford many examples of machinery and systems in the operation of which the respective components perform their assigned tasks in a continuing and constantly repeated sequence. When such machinery and systems are subjected to manual control, they are subject to human error, and to such an extend that it is economically undesirable. Of course, when facilities permit and production quantities involved are of sufficient magnitude, the machine operations are automated under the control of a suitably programmed computer or like medium. Such methods of automation, however, are costly and they do not lend themselves to simple and economical maintenance and adjustment. Nor are they readily versatile. In particular, to apply such expensive and complex controls to the operations of simple units such as a drill press, saw, or the like, in an ordinary machine shop is obviously quite impractical.

SUMMARY OF THE INVENTION

Accordingly, the present invention has in view a sequence control device which lacks the complexity and the maintenance problems of prior art devices and is so economical and versatile in application that it may be said to be universally applicable in the field of automation. Moreover, the invention provides a sequence control device which can be employed in small installations and to have special utility in the operation of machine tools.

In an illustrative embodiment herein set forth, it provides a case having therein means defining a track for mounting a reciprocable carriage. A wall portion of the case adjacent and generally parallel to the path of the carriage is removable and adapted to releasably and adjustably mount a series of electrical contacts defining working stations. A contact arm is carried by the carriage and arranged to move therewith in a manner to traverse the series of contacts on the removable wall portion and make successive engagement therewith. In the example illustrated, the contact arm carries a continuously operating, constant speed motor which drives a friction roller adapted to engage the track and as a result thereof cause the movement of the carriage along the track.

The contact arm is arranged to be selectively positioned so that in the movements of the carriage contacts will be made at the respective stations during each period the friction roller is in frictional engagement with the track to enable a drive of the carriage in an advancing stroke. The arm is adjustable to a second position in which it is out of cooperative relation with the contacts at the respective stations, at which point the drive of the carriage is disabled. It is noted that the arm has means biasing it to seek a position in which it will function in respect to the contact stations and there are separate means to move the arm to its second position and to drive the carriage in a return stroke.

It is important to note that the series of contacts are individually and selectively positionable to produce any desired time sequence in respect to the making and breaking of contacts. Of course, once the embodiment is set up, there may be additions to or deletions from the programmed series of operations to be provided thereby simply by activating or deactivating certain contacts. As will be obvious, by making the series of contacts individually replaceable and adjustable as a part of the case of the sequence control device, the device can be easily and quickly modified for use in a great variety of applications.

It is a feature of the invention that the sequence control device is essentially a highly versatile switching device which may be easily manufactured of a relatively few parts which may be standardized.

It is therefore a primary object of the invention to provide an improved sequence control switching device which may be economically manufactured, more efficient and satisfactory in use, adaptable to a wide variety of applications and unlikely to malfunction.

It is a further object of the invention to provide a generally new sequence control device which is widely and generally applicable in the field of automation.

Another object of the invention is to provide a sequence control device which may be easily adjusted and readily adapted to change to suit different work control requirements.

A further object of the invention is to provide a simple inexpensive sequence control device having particular advantage in application to the control of machine tools.

An additional object of the invention is to provide a sequence control device utilizing a simple mechanical action to obtain precisely timed movements of a signaling means controlling a machine tool or the like in an invariable continuous repetition of its assigned tasks.

Another object of the invention is to provide a programmed control device for use in automation.

A further object of the invention is to provide a sequence control device possessing the advantageous structural features, the inherent meritorious characteristics, and the means and mode of operation herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is an exploded perspective view, partly broken away and in part diagrammatic, of a sequence control device embodying the present invention;

FIG. 2 is a fragmentary view, enlarged with respect to FIG. 1, taken from the front of the device, a front closure panel being removed and the parts being shown in a position assumed intermediately of an advancing stroke of the traveling carriage;

FIG. 3 is a view similar to FIG. 2, showing in full lines the parts of the sequence control device in the position assumed at the end of an advancing stroke and showing in broken lines the position of the parts as assumed at the end of a return stroke;

FIG. 4 is a view in cross section, taken substantially along the line 4—4 of FIG. 2;

FIG. 5 is a view enlarged with respect to FIG. 4 showing interengagement of contact members and indicating in broken lines a second position assumed by one of the members in operation of the invention device; and FIG. 6 is an enlarged detail view of parts shown in FIG. 4.

Like parts are indicated by similar characters of reference throughout the several views.

DESCRIPTION OF THE ILLUSTRATED EMBODIMENT

Referring to the drawings, in its illustrated form the invention is disclosed as a sequence witching device capable of automatically and remotely controlling a system of machine components executing their assigned tasks in a continuous prescribed sequence which is automatically repeated. By way of example, it may be considered that the controlled system of machine components includes a plurality of electrically responsive actuators, such as four-way valve devices, which, when successively activated and deactivated, cause the system of machine components to carry out the handling, machining and like steps in connection with applied workpieces. The broad, universal capabilities of application of the invention as an automation controller will clearly appear from a consideration of the drawings and the description which follows, as will the facility with which the device lends itself to system adaptation and structural modification.

In the embodiment illustrated the operating components of the sequence control device are housed in a case 10 having the form of a closed rectangular box. This may be provided with mounting brackets so that it may be suitably installed on a table, machine frame or the like. For purposes of description, and not by way of limitation, the case comprises end walls 11 and 12, an upper or top wall 13, a lower or bottom wall 14, a backwall 15 and a front wall 16. The latter is provided by a closure panel 17 for the receptacle defined by the remainder of the case. The panel 17 is normally applied through the medium of screws 18.

The end walls 11 and 12 provide end supports for a pair of vertically spaced longitudinally extending rods 19 and 21. The rods are suitably installed and fixed to dispose in parallel spaced relation and in a plane parallel to and spaced forwardly of that defined by the backwall 15. Noting FIGS. 1 and 2 of the drawings, in the example illustrated the rods 19 and 21 are identical and have a head 22 at one end thereof which, on rod insertion through aligned apertures in the ends of the case, will have a limiting abutment against the exterior surface of the wall 11. The other ends of the rods will project through the wall 12 where they mount a washer 23 and have projected therethrough a cotter pin 24. The rods 19 and 21 are thereby fixed against longitudinal motion in respect to the case.

As will be seen, the rods 19 and 21 serve a dual function in that they provide a reinforcement of the case 10 and a carriage track as well, as will hereinafter more clearly appear.

Projected inwardly of the case 10 from the end wall 11 is a stop 25. The latter is fixed in respect to the wall 11 and disposes adjacent and immediately above the upper rod 19. Its projected length is limited. It is noted that the stop 25 may be anchored to the wall 11 as by being molded integrally therewith, in the event the case 10 is made of a plastic or like material, or mechanically joined to the wall as by a metallurgical bonding process or by screws in the event the case is made of metal. Formed in the bottom wall 14 of the case 10 is a through opening in which is installed a grommet 26 of an insulating material. Through the grommet 26 is threaded a pair of motor wires 27 and 28 along with a third wire representing one leg of a system energizing circuit.

The backwall of the case has formed in the upper part, and almost from end to end thereof, above the upper rod 19, a longitudinally extended through opening 31 of a rectangular configuration. A separable panel 32 is detachably secured to the case 10 to overlie and normally bridge the opening 31. Interposed between the panel 32 and the wall 15 is a contact mounting strip 34 made of an insulating material. The strip 34 has openings in its respective ends aligning with openings in portions of the wall 15 immediately thereunder, to either end of the opening 31, and openings in the panel 32 through which screws may pass for securing the panel and the interposed strip 34 to bridge the opening 31.

Viewing FIG. 1 of the drawings, it may be there seen that the strip 34 has a longitudinally extended slot 35 therein, intermediate its upper and lower edges. The slot 35 opens at one end adjacent the wall 12 and terminates inwardly of the strip immediately adjacent and spaced from its other end. As further shown, the slot 35 is occupied by a series of spaced apart electrical contact units 36. Referring to FIG. 5, each contact 36 comprises a short shaft 37 made of an electrically conductive material to one end of which is a hemispherical head 38. The opposite end of shaft 37 is threaded and mounts a nut 39 and spacer means 41. In each case, the shaft 37 disposes in slot 35 to dispose its head 38 to what may be considered the inner face of the strip 34. The threaded end of the shaft projects through and beyond the slot 35 to the outer side of the insulating strip 34 where it mounts thereon, in preceding relation to the washers 41, an electrically conductive eyelet to which is connected a wire 42.

As may be obvious, each nut 39 and spacer means 41 is adjustable to apply in conjunction with the head 38 of a contact 36 a clamping pressure to set the contact in a fixed relation along the slot 35 and to the strip 34. It will be evident that merely by loosening a nut 39 a contact 36 may be longitudinally adjusted in the slot 35 or may be bodily removed from the slot through the open end thereof which positions adjacent the wall 12. As will be self-evident, the wire 42 has a complementary relation to wire 29, the former being directed to an individually energizable device in a control system or a machine and the latter being common to the circuitry for all of the devices to which the wires 42 are directed.

Accordingly, as held in place by the panel 32 being fixed to the case 10, the strip 34 will position the heads 38 of contacts 36 in a selectively spaced relation so that the heads 38 project interiorly of the case in a longitudinal path. In this respect, take particular note of FIGS. 2, 4 and 5.

Within the interior of the case 10 a traveling carriage assembly is essentially outlined by a triangular plate 43 disposing as an inverted triangle to bridge the vertical distance between the rods 19 and 21. Through the apex portion of the plate 43 which is lowermost, there is projected a bolt 44 on which is rotatably mounted, to an end, a roller 45. The roller 45 has a groove in its periphery the cross-sectional outline of which is complementary to the upper surface of the rod 21, to accommodate the same therein and to ride thereon. As seen in the drawings, there is mounted in the upper or base end of the plate 43, to its respective corners, like bolts 46 and 47 respectively carrying rollers 48 and 49 which are constructed like the roller 45. The rollers 48 and 49 are thereby spaced longitudinally of the upper rod 19 and so disposed to nest in their portions uppermost said rod so they may track thereon. The arrangement is one to achieve a mounted relation of the plate 43 relative to the rods 19 and 21, the latter defining a track along which and therebetween the plate 43 is freely movable along the rods, from the wall 11 to the wall 12.

A portion of the plate 43, offset from the vertical center line thereof going through its apex, toward the bolt 46, most adjacent the wall 11, is outstruck toward the back wall 15 to define a projecting ear 51. The ear 51 is thereby positioned adjacent the upper and base end of the plate 43 and vertical, displaced to what may be considered its trailing edge.

A lever arm 52 has an aperture adjacent and spaced from its lower end through which projects the bolt 44. The arm 52 is so disposed thereby to pivotally mount from movement intermediately of the planes respectively defined by the plate 43 and the rods 19 and 21 and parallel thereto. The ends of the arm 52 project respectively below and above the plate 43. The lower extremity of the arm is turned over to define a shoulder 53 which projects towards the back wall 15 of case 10. Spaced between the bolt 44 ad the shoulder 53, the lower extremity of the arm 52 mounts a projected stud 55. As seen in FIG. 2 of the drawings, an angularly formed torsion spring blade 54 is intermediately anchored about the stud 55 to have one arm angularly project to bias against the edge of the shoulder 53 most adjacent the case wall 12 while its other arm projects in the same sense and has an arcuately formed extremity bearing against the under surface of the rod 21. The influence of the spring 54 is such to normally bias the lower end of the arm 52 towards the case wall 11, and, correspondingly, the upper end of the arm 52 towards the case wall 12.

Movement of the arm 52 under the influence of spring 54 is limited in a clockwise sense, as viewed in FIG. 2, by the engagement of a roller 56, formed similarly to the rollers 45, 48 and 49, in a bearing and tracking relation to the uppermost surface of rod 19. The roller 56 is fixed for rotation with the projected extremity of a drive shaft 57 of an electric motor 58. The motor 58, in turn, has the end thereof from which the shaft 57 projects fixed by bolts 59 in a secured relation to a portion of the arm 52 above the rod 19. The motor wires 27 and 28 extend from the motor 58 to provide a means by which the motor may be powered to continuously drive the shaft 57 and the connected roller 56.

The arm 52 projects upwardly of the motor 58. Its uppermost extremity is offset by a right angle bend therein to position in closely adjacent parallel relation to the back wall 15 of the case 10. Fixed on this uppermost extremity of the arm 52, to the side thereof most adjacent the wall 15 is the head of a contact 61. The latter is adapted to achieve a successive mating relation with individual contacts 36 carried by the strip 34, as will be further described.

The contact 61 is constructed like the individual contacts 36 and similarly applied to the arm 52. Its body has the form of an electrically conductive shaft segment 62 including at one end an enlarged head 63 forming the electrical contact adapted to mate with the contacts 36. The other threaded end of the shaft segment 62 which projects oppositely of the arm 52 mounts in succession an electrically conductive eyelet to which is connected the previously mentioned wire 29, spacer means 65 and a nut 64. It will be noted that the arm 52 has a through opening 66 within which are positioned concentrically telescoped, mating, nonconductive bushings 67 and 68. The latter support the body of the contact 61 so that it is insulated from the arm 52.

Mounted on the bolt 44 between plate 43 and the arm 52 is a coiled compression spring 69 the coils of which are normally spaced. The latter applies a bias of the arm 52 inwardly of the case 10, towards the back wall 15. As a result of this bias, the head 63 of contact 61 is biased toward the contacts 36 to achieve a firm yet yielding interengagement of the contacts as they align.

FIGS. 2 and 3 of the drawings illustrate that the arm 52 has an inoperative and an operative position. In its operative position, the arm is under the influence of spring 54 and is in a position inclining in the direction of the case end wall 12. In this position of the arm the drive roller 56 limits against and is frictionally engaged to the upper surface of the rod 19 to track thereon. Under such conditions the head of contact 61 will move in a path corresponding to the line of the contacts 36 and in an orientation to cause the head 63 to firmly engage with each individual contact 36, as it aligns therewith according to the longitudinal position of travel of its mounting carriage including the plate 43.

In its inoperative position, the arm 52 is placed vertically upright to extend generally perpendicular to the rods 19 and 21, against the urging of spring 54 as shown in broken lines in FIG. 3. In this position of the parts, the roller 56 is lifted from its tracking engagement with rod 19 and the upper extremity of arm 52 is displaced above the horizontal line of contacts 36 as seen in FIG. 5 of the drawings. Under such circumstances the contact 61 cannot complete a circuit through anyone of the contacts 36.

Mounted perpendicular to the exterior surface of the end wall 12 is an actuator 71. This actuator may comprise a conventional pneumatic or hydraulic control cylinder 72 from a piston bearing on the interior of which projects a rod 73. The latter extends through an opening in the end wall 12 and into the case 10 in a position of alignment with the offset portion of the upper end of the arm 52. The cylinder 72 has manifold chambers 74 and 75 at its respective ends to which are connected respective lines 76 and 77 for conducting fluid under pressure to and from the respectively opposite faces of the contained piston.

The unit 71 may be under the influence of a four-way valve which is electrically connected to provide that it, on receipt of a suitable signal by engagement of the contact 61 to a remote one of the line of contacts 36, will be electrically operated to either project or retract the rod 73 in respect to the arm 52. Since the functional movements of the operating components of actuator 71 are well known to mechanics well versed in the art, the details thereof are not described.

Movement of the rod 73 inwardly of the case 10 causes it to engage and to rock arm 52 towards an upright position, displacing the drive roller 56 from the rod 19 and thereby disabling the drive of the arm provided by the motor 58. This procedure also displaces the head 63 of contact 61 free and clear of the contacts 36. In this respect see FIG. 5. Continuing inward thrusting movement of the rod 73 will cause the arm 52 to move to a vertical position in which it abuts the tab 51. Through the medium of this engagement the rod 73 then moves both the contact arm and its carriage, which embodies the plate 43, in a reverse direction from its advancing movement and to a point adjacent the end wall 11. As is obvious, when the piston rod 73 is retracted inwardly of its housing, the arm 52 is released to function as required in the sequence control operation provided by the invention mechanism.

In the operation of the described sequence control device, the motor 58 is maintained in a continuously energized state. Therefore it continuously drives the roller 56. Considering the starting or beginning position of the components of the sequence control device, the rod 73 is fully projected within the case 10 to abut and hold the arm 52 adjacent the end wall 11 and in a relatively vertical position, with contact 61 free and clear of the contacts 36 and roller 56 free of the tracking rod 19. In this position the arm 52 is held in abutment with the projected end of the stop 25. Under such circumstances the contact head 63 disposed above the line of the contacts 36.

Upon actuation of a suitably timed cycling switch, when arm 52 is at or arrives at its described inoperative position, the actuator 71 may be operated through the medium aforementioned to retract the rod 73. As arm 52 is released from the influence of rod 73, the bias of spring 54 becomes effective. This pivots the arm 52 clockwise, as seen in FIG. 2 of the drawings. As this occurs, the roller 56 will seat on and in a tracking relation to the upper surface of the rod 19. Since the roller 56 is continuously driven, as it engages the rod 19, a propulsion of the entire assembly including the arm 52 and plate 43, together with the connected rollers which bear on the adjacent surfaces of rods 19 and 21 is thereby initiated. A frictional drive is accordingly established in which the carriage plate 43 and associated parts will be caused to travel longitudinally of the rods 19 and 21 and towards the end wall 12 of the case 10. It must be emphasized that motor 58 is a constant speed motor and therefore the carriage will move at a substantially constant speed throughout the limit of its travel from one end of the case to the other.

An attendant feature of the release of the arm 52 is that as it inclines in the direction of the end wall 12 and brings the roller 56 in tracking relation to the rod 19, the head 63 of contact 61 is thereby disposed in a plane common to the several contacts 36.

It will be obvious that as the carriage advances toward the case end wall 12, the contact 63 will engage, in a predetermined timed sequence, the several contacts 36. As the carriage moves under the control of motor 58 through this stroke, which may be considered an advancing stroke, the contact 63 in moving into and out of engagement with successive contacts 36 may function to energize and deenergize any control circuits of which such contacts are a part. It will of course be obvious that such control circuits may be arranged to initiate and/or interrupt the function of one or more elements of a related system or machine. As noted, the motion is continuous until suitably interrupted. According to a feature of the invention, the final contact 36 engaged by the arm 52 may be disposed in a circuit including energizing means for the valving means controlling actuator 71. Thus the final contact 36 may dually function in a related system and to route fluid under pressure by way of manifold 75 while exhausting fluid by way of manifold 74 to project the rod 73. Thus, after completing one traversal of the series of contacts 36, the rod 73 projects to rock the arm 52 upward as previously described and return it and the carriage of which it is a part to a starting position. This may also be caused to occur upon an appropriate signal from a moving workpiece in the related system. Also actuator 71 may be controlled by the arrival of a workpiece at a station to hit a switch and send a signal to retract rod 73 so that the sequence of operation inherent in the device described may begin again, the commencement being signaled by the withdrawal of the piston rod.

As will be obvious the system related to the sequence control device may be so wired that the making of the final contact 36, in addition to controlling the actuator 71, may cause completion of the assigned series of operational steps to which the device is applied.

Accordingly, the series of operations provided for by the single invention control device constituting a plural switching medium is continuous and may be automatically repeated in a simple fashion by means of wiring circuitry within the capabilities of any mechanic versed in this particular art. Since the wiring will in each case depend upon the application, and details thereof are not essential to an understanding of the present invention, they are not described.

The advantageous features of the invention which have been heretofore discussed are inherent in the described embodiment. It is repeated that since the motor 58 is a constant speed drive medium, the time lapse between operational steps may be precisely predicted. Moreover, the nature of the invention embodiment as here described is such as to make it extremely simple to vary the time lapse between operational steps by a simple adjustment of the spacing of the contacts 36. Thus, the control device of the invention can be applied to any application and easily and accurately timed to meet the requirements of a system or machine operation. Of course, contacts 36 may be readily removed or substituted and changed in number and position whereby to effect changes in a desired programmed series of operations. The manner in which the invention is embodied makes the contacts readily accessible for initial wiring and rewiring. One aspect of the invention is the obviously simple expedient of substituting mounting strips to produce any desired arrangement and position of contacts which are required. The change of character of the control device is thus within the ready comprehension and capabilities of any ordinary intelligent user.

In summary, the invention provides a most adaptable switching device which may be applied to automate different machines and to vary the condition of automation of such machines quickly and efficiently.

Attention is directed to the fact that in the production of a control device in accordance with the invention it can be made of any size and shape and to provide any number of control stations as represented by the contacts 36. The nature of the construction as here presented makes parts and stocking requirements minimal. A supplier may stock several sizes or lengths of cases 10 and matching actuators 71. However, as to all other parts, they may have universal sizing. As a matter of fact, the strip 34 and track members 19 and 21 can be provided in one large size and then reduced to the required size by the user in assembling the control device he requires.

Attention is directed to the fact that in addition to acting as a biasing means for inducing an operational position of arm 52, the spring 54 provides a drag or resistance which assists in damping rough and undesirable disturbances of the traveling carriage as here provided.

It should be obvious from the foregoing that here is a simple inventive concept which lends to the art of automation a most economical and utilitarian device. It should be also obvious, of course, that the arrangement of the track and the contacts to be made in sequence may be such that they are disposed in an arcuate fashion and to define curved paths as well as straight lines. The path of movement of arm 52 may be modified to this end. Such is comprehended within the spirit and scope of the present invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, ut that the means and construction herein disclosed comprise but one of several modes of putting the invention into effect.

I claim:

1. A sequence control device comprising a unit structure including track means, a plurality of control stations bordering said track means, said control stations being defined by spaced signal transmitting means, means for traversing said track means including means for energizing said signal transmitting means in a selected pattern and in a continuing sequence and means for disabling said energizing means at the end of said sequence, said unit structure comprising a case, means defining said series of control stations within said case, said traversing means being a traveling carriage reciprocal in said case, drive means for said carriage having a common mount with said energizing means in connection with said carriage and movable to a tracking driving relation on said track means to bring said energizing means in a position whereby on movement of said carriage said energizing means will be disposed in time spaced sequence in an operative relation to said signal transmitting means at the respective control stations.

2. A sequence control device as set forth in claim 1 characterized by a lever means pivotally mounted on said travelling carriage for movement between an inoperative and an operative position, said drive means and said energizing means being mounted to said lever means and said disabling means being operatively related to move said lever means to an inoperative position at the end of a sequence.

3. A sequence control device as set forth in claim 2 characterized by means in connection with said lever means applied to normally bias said lever means to its operative position and in said operative position to bias said energizing means to make contact with and to thereby energize said signal transmitting means.

4. A sequence control device as set forth in claim 1 characterized by said signal transmitting means being electrical contacts and means forming a wall portion of said case providing a base for a variable placement of said contacts thereon in the path of said energizing means.

5. A sequence control device as set forth in claim 1 characterized by said drive means having as its power source a constant speed drive motor means.

6. A sequence control device as set forth in claim 1 characterized by said case means including a panel mounting said signal transmitting means in a selective spaced relation thereon and providing means for quick adjustment or removal thereof.

7. A sequence switch device including a unit support structure, track means on said support structure, means arranged to traverse said track means, a plurality of control stations bordering said track means, each station including signal transmitting means, said traversing means including in connection therewith means for energizing selected signal transmitting means in time spaced sequence, said traversing means embodying its own drive means and there being means for enabling and for automatically disabling said drive means in accordance with a selected and predetermined pattern of cyclic movement of said traversing means.

8. A sequence switch device as set forth in claim 7 characterized by means to induce said drive means to be conditioned to move said traversing means along said track means in one direction and said disabling means including means arranged to respond to a predetermined movement of said traversing means in said one direction to reverse such movement and return said traversing means, automatically, to a point of its beginning of a sequence of cyclic movement.

9. A switch device as set forth in claim 8 characterized by said reversing means being adapted to inhibit the operation of said signal energizing means during said reversing movement.

10. A switch device as set forth in claim 7 characterized by said traversing means including a carriage device and said signal energizing means including an arm carried by said carriage device and adapted to conductively relate to said signal transmitting means by contact therewith to energize the same, whereby, in a continuing movement of said carriage device, a series of said signal transmitting means will be operated in time spaced sequence by contact by said arm, there being constant speed drive means for said carriage device to provide that the time lapse between signals will correspond to the spacing of the successively contacted signal transmitting means.

11. A switch device as set forth in claim 10 characterized by means responding to movement of said carriage device to a predetermined position on said track means in reference to said signal transmitting means to automatically move said carriage device from said predetermined position back to its starting point on said track means and to displace said arm in the process to inhibit its contact with said signal transmitting means, said last named moving means being adapted to release said arm from its displaced position hereby to initiate a drive of said carriage device and an operative sequential contact of said arm with said signal transmitting means, in said cyclic pattern of movement.

12. A switch device as set forth in claim 11 characterized by said arm having means normally biasing the same to a position to engage said signal transmitting means in the course of continued movement of said carriage device along said track means to the point of the function of said responding means.

13. A switch device as set forth in claim 12 characterized by said automatically responding means including an element projectable to disengage said drive means from said track means in the curve of movement of said carriage device to its starting point and the beginning of a sequence.

14. A switch device as set forth in claim 12 characterized by said automatically responding means including a reciprocable member which at one extreme position is adapted to hold said carriage device stationary at its starting point and at its other extreme position is adapted to engage and displace said arm to a position wherein it is inhibited from contact with said signal transmitting means.

15. A switch device as set forth in claim 14 characterized by said drive means including a friction roller which on displacement of said arm is displaced therewith and from said track means.

UNITED STATES PATENT OFFICE
CERTIFICATE OF CORRECTION

Patent No. 3,610,846            Dated October 5, 1971

Inventor(s) William W. Hanshew

It is certified that error appears in the above-identified patent and that said Letters Patent are hereby corrected as shown below:

Column 1, line 8, following "tool and" delete the word "the".

Column 4, line 55, "ad" should read -- and --.

Signed and sealed this 18th day of April 1972.

(SEAL)
Attest:

EDWARD M. FLETCHER, JR.            ROBERT GOTTSCHALK
Attesting Officer            Commissioner of Patents